United States Patent
Goyal

(10) Patent No.: US 7,337,194 B2
(45) Date of Patent: Feb. 26, 2008

(54) ASYNCHRONOUS REMOTE MIRRORING TECHNIQUES FOR DATABASES

(75) Inventor: Pawan Goyal, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 379 days.

(21) Appl. No.: 10/752,153

(22) Filed: Jan. 5, 2004

(65) Prior Publication Data

US 2005/0165851 A1  Jul. 28, 2005

(51) Int. Cl.
*G06F 12/00* (2006.01)
(52) U.S. Cl. .................. 707/200; 707/204; 707/10; 711/162; 711/154; 711/161; 711/165
(58) Field of Classification Search ............... 707/204, 707/200
See application file for complete search history.

(56) References Cited

U.S. PATENT DOCUMENTS

| | | | |
|---|---|---|---|
| 5,375,232 A | 12/1994 | Legvold et al. | |
| 5,594,900 A | 1/1997 | Cohn et al. | |
| 5,657,440 A | 8/1997 | Micka et al. | |
| 5,937,414 A | 8/1999 | Souder et al. | |
| 6,052,797 A * | 4/2000 | Ofek et al. ................ | 714/6 |
| 6,148,383 A | 11/2000 | Micka et al. | |
| 6,173,377 B1 * | 1/2001 | Yanai et al. ............... | 711/162 |
| 6,480,970 B1 | 11/2002 | DeKoning et al. | |
| 6,502,205 B1 | 12/2002 | Yanai et al. | |
| 7,055,059 B2 * | 5/2006 | Yanai et al. ................ | 714/7 |
| 2002/0078296 A1 | 6/2002 | Nakamura et al. | |
| 2003/0145168 A1 | 7/2003 | LeCrone et al. | |
| 2004/0158588 A1 * | 8/2004 | Pruet, III ................. | 707/204 |

* cited by examiner

*Primary Examiner*—Wilson Lee
*Assistant Examiner*—Binh V Ho
(74) *Attorney, Agent, or Firm*—GSS Law Group; Jeffrey P. Aiello

(57) ABSTRACT

There is provided a method and system to asynchronously remotely copy database content changes from a primary site to a remote site utilizing consistency groups. Log information and data are separated. When log information and data are copied to the remote site, the log information is given priority over data. Data is not copied for the current consistency group for which log information is in the process of being copied, until all log information in the current consistency group has been copied. Thus, only data included as part of the consistency groups for which all log information has been copied, is copied to the remote site. Because most logs are written sequentially, copying the log blocks immediately does not result in a larger amount of data being copied. In addition, since the log block has been copied over at the earliest instant possible, the extent of data loss has been reduced to the minimum possible in an asynchronous system.

11 Claims, 6 Drawing Sheets

ASYNCHRONOUS REMOTE MIRRORING TECHNIQUES FOR DATABASES

FIELD OF THE INVENTION

The present invention relates to distributed databases. More specifically, the present invention relates to a technique for performing an asynchronously remotely copy of a distributed database.

BACKGROUND OF THE INVENTION

Disaster recovery techniques that can tolerate the failure of a complete data center have become increasingly important. A classical technique used for tolerating data center failures is copying the data to a remote site. This technique is known as remote-mirroring. There are various forms of remote-mirroring. They can primarily be classified as either synchronous or asynchronous. Synchronous remote-mirroring techniques delay acknowledging an I/O to a host until it has been executed on the remote site as well. Asynchronous techniques, on the other hand, acknowledge an I/O as soon as it executes on the primary site.

Synchronous remote-mirroring techniques usually have high impact on I/O performance, high bandwidth requirements, zero data loss, and very small time to recovery. Asynchronous remote-mirroring techniques usually have low or no impact on I/O performance, low bandwidth requirements, possibility of data loss, and higher time to recovery.

Asynchronous mirroring techniques can be classified further along two dimensions, including write-ordering and write-coalescing. Write-ordering is focused on maintaining the order of writes at the remote mirror. Write-coalescing is focused on coalescing multiple writes to the same block (at the mirror) into one write. Write coalescing reduces bandwidth requirements when write-locality exists.

An asynchronous technique that provide write-coalescing to reduce bandwidth requirement, and also achieve most of the benefits associated with synchronous mirroring, are desirable.

BRIEF SUMMARY OF THE INVENTION

According to the present invention, there is provided a method and system to asynchronously remotely copy database content changes from a primary site to a remote site utilizing consistency groups. Log information and data are separated. When log information and data are copied to the remote site, the log information is given priority over data. Data is copied asynchronously in the background. Data is not copied for the current consistency group for which log information is in the process of being copied, until all log information in the current consistency group has been copied. Thus, only data included as part of consistency groups prior to the current consistency group are copied.

The method includes data and logs to be copied from the primary site to the remote site in a series of consistency groups. In addition, the method including identifying the logs included within each of the consistency groups. Moreover, the method includes copying the logs within each of the consistency groups from the primary site to the remote site in a FIFO order. The logs are copied asynchronously from the primary site to the remote site before the data is asynchronously remotely copied from the primary site to the remote site.

BRIEF DESCRIPTION OF THE DRAWINGS

The present invention is illustrated by way of example and not by limitation in the accompanying figures in which like reference numerals indicate similar elements and in which.

DETAILED DESCRIPTION OF THE INVENTION

The present invention provides a storage system cache management technique that is particularly suitable for applications, such as databases. In that regard, the present invention provides for log priority for remote-mirroring of databases at the storage system layer that do not require trading off data loss for bandwidth. The tradeoff is shifted to a much softer one time to recovery and bandwidth.

Figure 1:
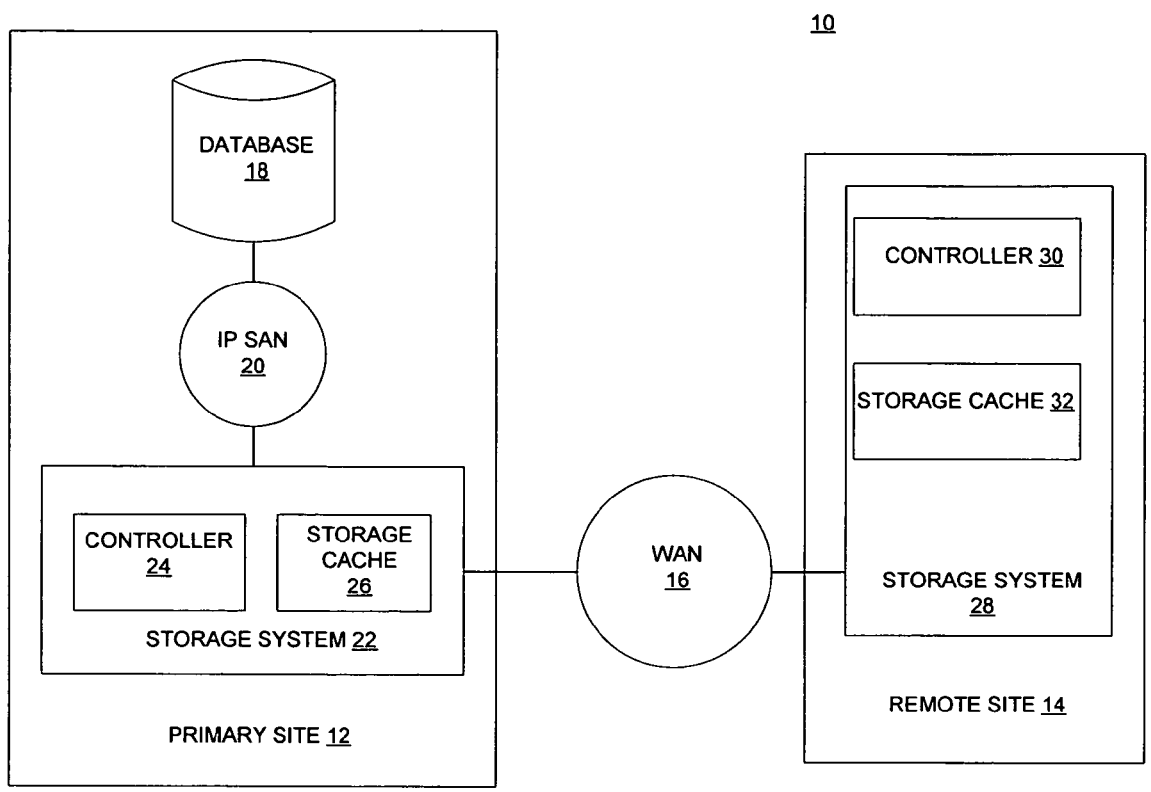
FIG. 1 shows a functional block diagram of an exemplary distributed database system that can utilize the storage system cache management technique according to the present invention.

FIG. 1 shows a functional block diagram of an exemplary distributed database system 10 that can utilize the storage system cache management technique according to the present invention. Distributed database system 10 includes a primary site 12 that is coupled at least one remote site 14 over a telecommunications network, such as WAN 16 or the Internet. While only one remote site 14 is shown in FIG. 1, but it should be understood that distributed database system 10 can include more than one remote site. Primary site 12 includes an application, such as a database 18, a Storage Area Network (SAN) 20 and a storage system 22. Storage system 22 includes at least one mass storage device (not shown), such as a Hard Disk Drive (HDD), a controller 24 that informs a storage cache 26 about the volumes and files forming log and data volumes associated with database 18. Remote site 14 includes a storage system 28. Storage system 28 includes at least one mass storage device (not shown), such as an HDD, a controller 30 and a storage cache 32. Storage systems 22 and 28 each separately store log records and data records.

Typically, all the data and log volumes that belong to a database are grouped together in a consistency group. Achieving write-ordering simultaneously with write-coalescing requires use of additional techniques.

Figure 2:
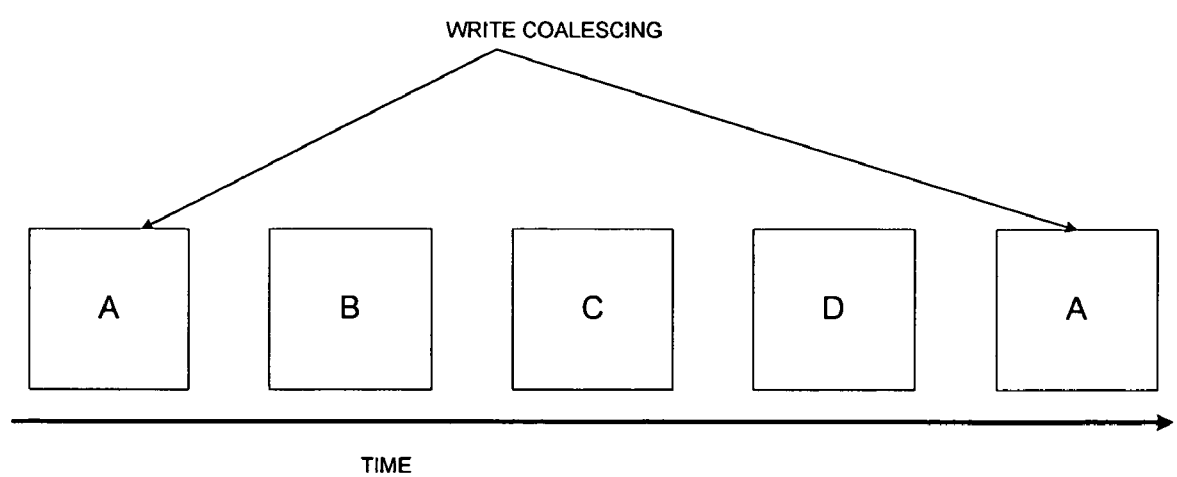
FIG. 2 shows a write sequence in which write-coalescing leads to a violation of write-ordering.

FIG. 2 shows a write sequence 34 in which write-coalescing leads to a violation of write-ordering. If blocks were updated on the remote site one block at a time, then write-coalescing of block A will lead to a write-ordering violation.

To avoid such a violation of write-ordering, an atomic update technique is used at the remote site. The sequence of writes is partitioned into a sequence of batches. Write-coalescing is done within a batch and each batch is atomically updated at the remote site. Since write-coalescing and, thus, write re-ordering occurs only within a batch, updating the batch atomically ensures that no write re-ordering is observed at the remote site. The size of each batch can be time or size based, or chosen more flexibly via the techniques provided in Seneca: Remote Mirroring Done Write, In Proceedings of the UESNEX Technical Conference (pages 253-268, 623, M. Ji, A. Veitch, and J. Wilkes). In practice, the batch size is time based.

Figure 3:
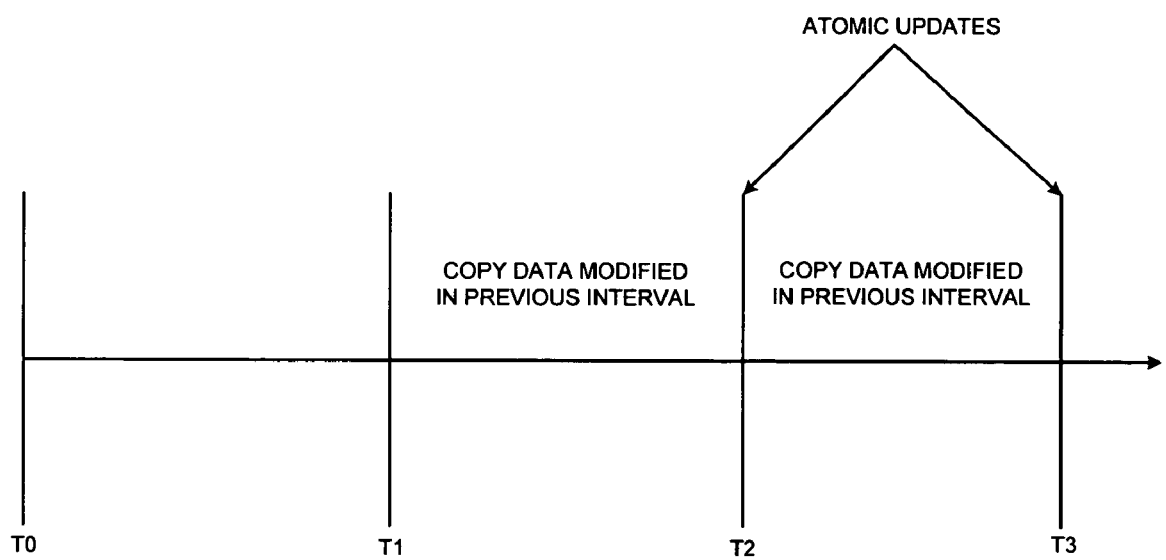
FIG. 3 shows a typical asynchronous remote-mirroring scheme that does write-coalescing while ensuring correct ordering.

FIG. 3 shows a typical asynchronous remote-mirroring scheme 36 that does write-coalescing while ensuring correct ordering. Observe from FIG. 3 that since write-ordering is guaranteed to hold only at batch boundaries, disaster at the primary site could lead to data loss of up to the batch size. On the other hand, to reduce bandwidth by maximizing write-coalescing, a large batch size is desirable.

According to an exemplary embodiment of the invention, a log priority technique to achieve write-coalescing, in which there is not a tradeoff of data for bandwidth, is provided. The technique is based on the observation that in databases, log data is more important than regular data.

Log Priority Technique

Databases such as IBM's DB2, maintain a log of all updates to a database. In response to a crash, the database can be recovered to a transaction consistent state using the log even if all the modifications to the data are lost. The log can also be exploited to achieve high write coalescing.

Figure 4:
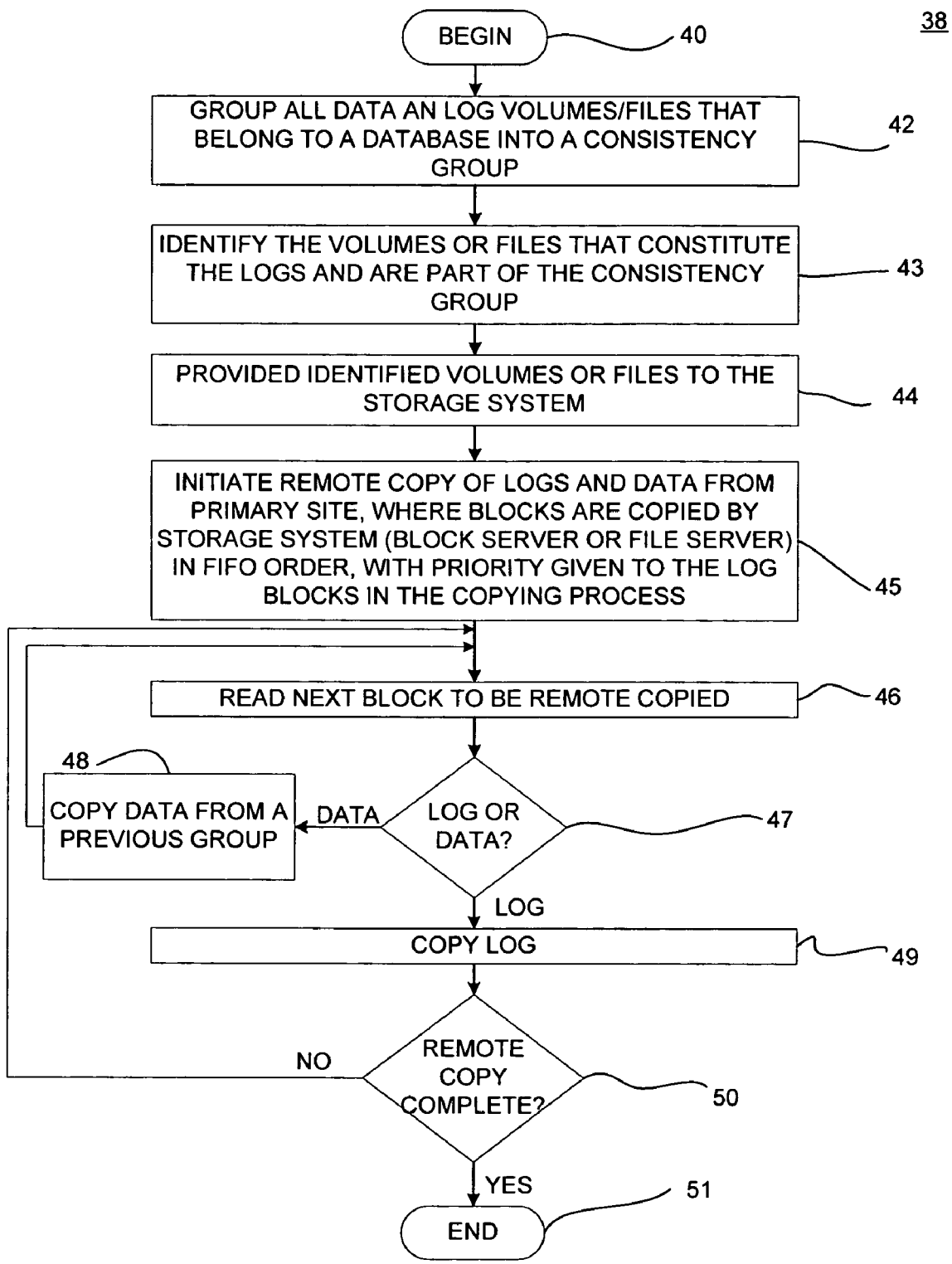
FIG. 4 illustrates a method of copying log blocks from a primary site to a remote site to achieve write-coalescence, according to an exemplary embodiment of the invention.

FIG. 4 illustrates a method 38 of copying log blocks from a primary site to a remote site to achieve write-coalescence, according to an exemplary embodiment of the invention. At block 40, method 38 begins.

At block 42, all the data and log volumes/files that belong to a database are grouped together in a consistency group. A consistency group is mirrored to the remote site using the atomic update technique described above.

At block 43, the database administrator identifies the volumes or files that constitute the logs and are part of the consistency group At block 44, the database administrator provides the identified volumes or files to the storage system (e.g., storage system management program).

At block 45, remote copying of logs and data from the primary site is initiated. Blocks are copied by the storage system (block server or file server) in FIFO order, with priority given to the log blocks. If a log block is present, it is copied before any data block. Also, remote mirroring of a log block is not delayed to achieve write-coalescing.

At block 46, block to be remote copied is read.

At block 47, a determination is made as to whether the block to be copied is a log block.

At block 48, if no, then data from a previous group is copied to the remote site.

At block 49, if yes, then the log block is copied to the remote site.

At block 50, a determination is made as to whether there are additional blocks to be copied to the remote site.

At block 51, if no, then method 38 ends.

Figure 5:
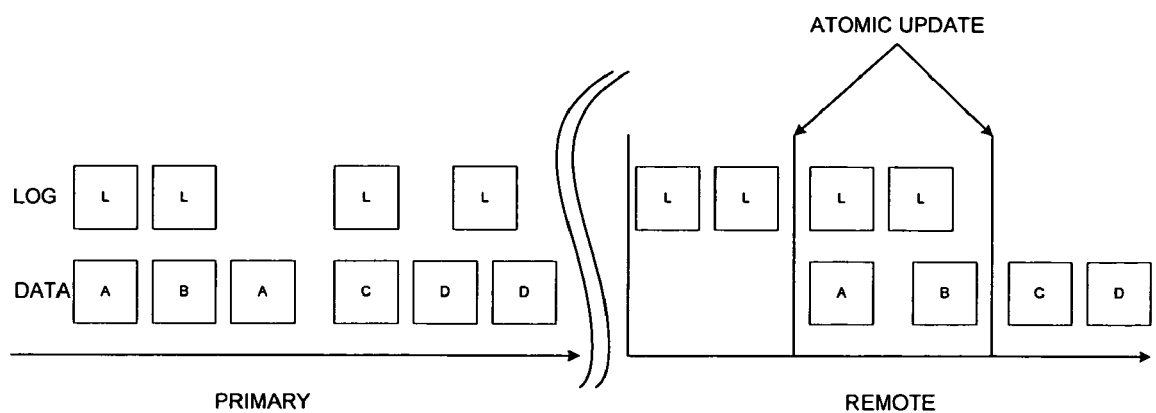
FIG. 5 illustrates the log priority technique, according to an exemplary embodiment of the invention.

FIG. 5 illustrates the log priority technique 52, according to an exemplary embodiment of the invention. Because most logs are written sequentially, copying the log blocks immediately does not result in a larger amount of data being copied. In addition, since the log block has been copied over at the earliest instant possible, the extent of data loss has been reduced to the minimum possible in an asynchronous system.

Figure 6:
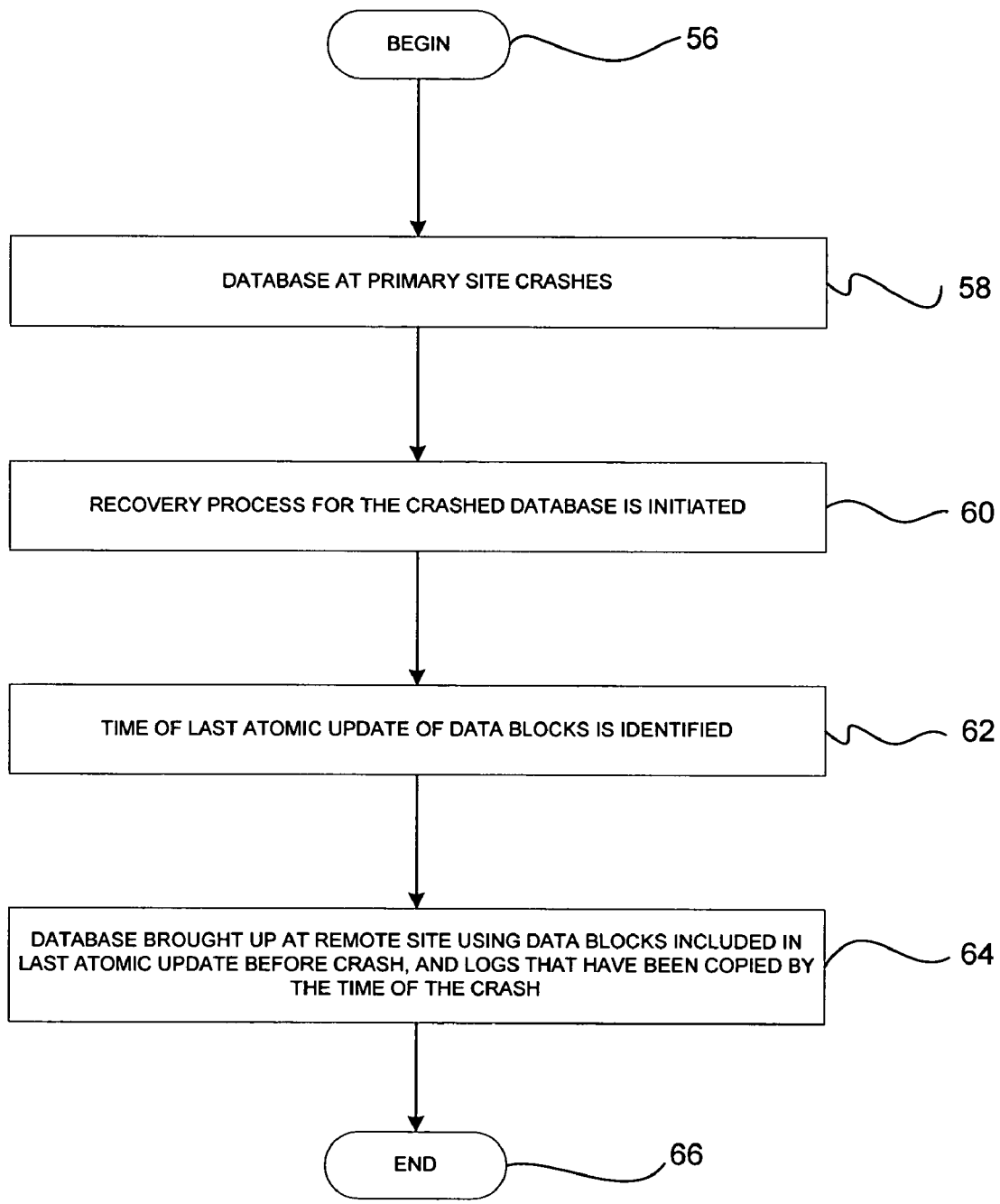
FIG. 6 illustrates a method of recovering from a crash of a database at a primary site, according to an exemplary embodiment of the invention.

FIG. 6 illustrates a method 54 of recovering from a crash of a database at a primary site, according to an exemplary embodiment of the invention. At block 56, method 54 begins.

At block 58, database at the primary site crashes.

At block 60, the recovery process associated with the crashed database is initiated.

At block 62, the time of the last atomic update of the data blocks is identified.

At block 64, the database is recovered at the remote site, including all data blocks which have been atomically updated and all logs that have been copied, as of the time the database at the primary site crashed. Thus, the only data loss that occurs is due to the log blocks that have not been copied by time t. Since log blocks are always given priority, this is the smallest amount of data loss that will occur in any asynchronous system.

At block 66, method 54 ends.

Although the foregoing invention has been described in some detail for purposes of clarity of understanding, it will be apparent that certain changes and modifications may be practiced that are within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for asynchronously remotely copying database content changes from a primary site to a remote site utilizing consistency groups, the method comprising:
   including data and logs to be copied from the primary site to the remote site in a series of consistency groups;
   identifying the logs included within each of the consistency groups; and
   copying the logs within each of the consistency groups from the primary site to the remote site in a FIFO order, wherein the logs within each of the consistency groups are given priority over the data,
   whereby, the logs within each of the consistency groups are copied asynchronously from the primary site to the remote site before any of the data within their respective consistency group is copied.

2. The method of claim 1 wherein the consistency group comprises a batch of logs and data.

3. The method of claim 1 further comprising recovering from a crash of the database at the primary site wherein the recovery process comprises:
   identifying the time the data was last updated; and
   recovering the database at the remote site, including all data which has been copied and all logs that have been copied, as of the time the database at the primary site crashed,
   whereby, the only data loss that occurs is due to the log blocks that have not been copied by the time of the crash,
   whereby, since log blocks are always given priority, this is the smallest amount of data loss that will occur in an asynchronous system,
   whereby write coalescence is maximized,
   whereby bandwidth is conserved.

4. A disaster recovery system having a primary storage site and a remote storage site, having a method for asynchronously remotely copying database content changes from a primary site to a remote site utilizing consistency groups, the method comprising:
   including data and logs to be copied from the primary site to the remote site in a series of consistency groups, wherein the copying of the data and the logs to the, remote site provides for creating a back-up of the data and logs;

identifying the logs included within each of the consistency group; and copying the logs within each of the consistency groups from the primary site to the remote site in a FIFO order, whereby, the logs are copied asynchronously from the primary site to the remote site before the data is asynchronously remotely copied from the primary site to the remote site.

5. The disaster recovery system of claim 4 wherein the consistency group comprises a batch of logs and data.

6. The disaster recovery system of claim 4 further comprising recovering from a crash of the database at the primary site wherein the recovery process comprises:

identifying the time the data was last updated; and recovering the database at the remote site, including all data which has been copied and all logs that have been copied, as of the time the database at the primary site crashed, whereby, the only data loss that occurs is due to the log blocks that have not been copied y the time of the crash, whereby, since log blocks are always given priority, this is the smallest amount of data loss that will occur in an asynchronous system, whereby write coalescence is maximized, whereby bandwidth is conserved.

7. The disaster recovery system of claim 4, wherein the logs within each of the consistency groups are copied asynchronously from the primary site to the remote site before the data within each of the respective consistency groups is asynchronously remotely copied from the primary site to the remote site.

8. The disaster recovery system of claim 4, wherein each of the logs are log blocks and each of the data are data blocks.

9. A storage system for asynchronously remotely copying content changes stored in the storage system, the system comprising:

a primary site to include data and logs to be copied from the primary site to a remote site in a series of consistency groups;

the primary site identifying the logs included within each of the consistency groups; and the primary site sending the logs within each of the consistency groups to the remote site in a FIFO order, whereby, the logs are copied asynchronously from the primary site to the remote site before the data is asynchronously remotely copied from the primary site to the remote site.

10. The storage system of claim 9 wherein the consistency group comprises a batch of logs and data.

11. The storage system of claim 9 further comprising recovering from a crash of the database at the primary site wherein the recovery process comprises:

identifying the time the data was last updated; and recovering the database at the remote site, including all data which has been copied and all logs that have been copied, as of the time the database at the primary site crashed, whereby, the only data loss that occurs is due to the log blocks that have not been copied by time of the crash, whereby, log blocks are always given priority to provide the smallest amount of data loss that will occur in an asynchronous system, whereby write coalescence is maximized, whereby bandwidth is conserved.

* * * * *